Aug. 3, 1937.                R. N. S. MERRITT                2,088,998
                                SAW TOOTH
                            Filed March 13, 1936
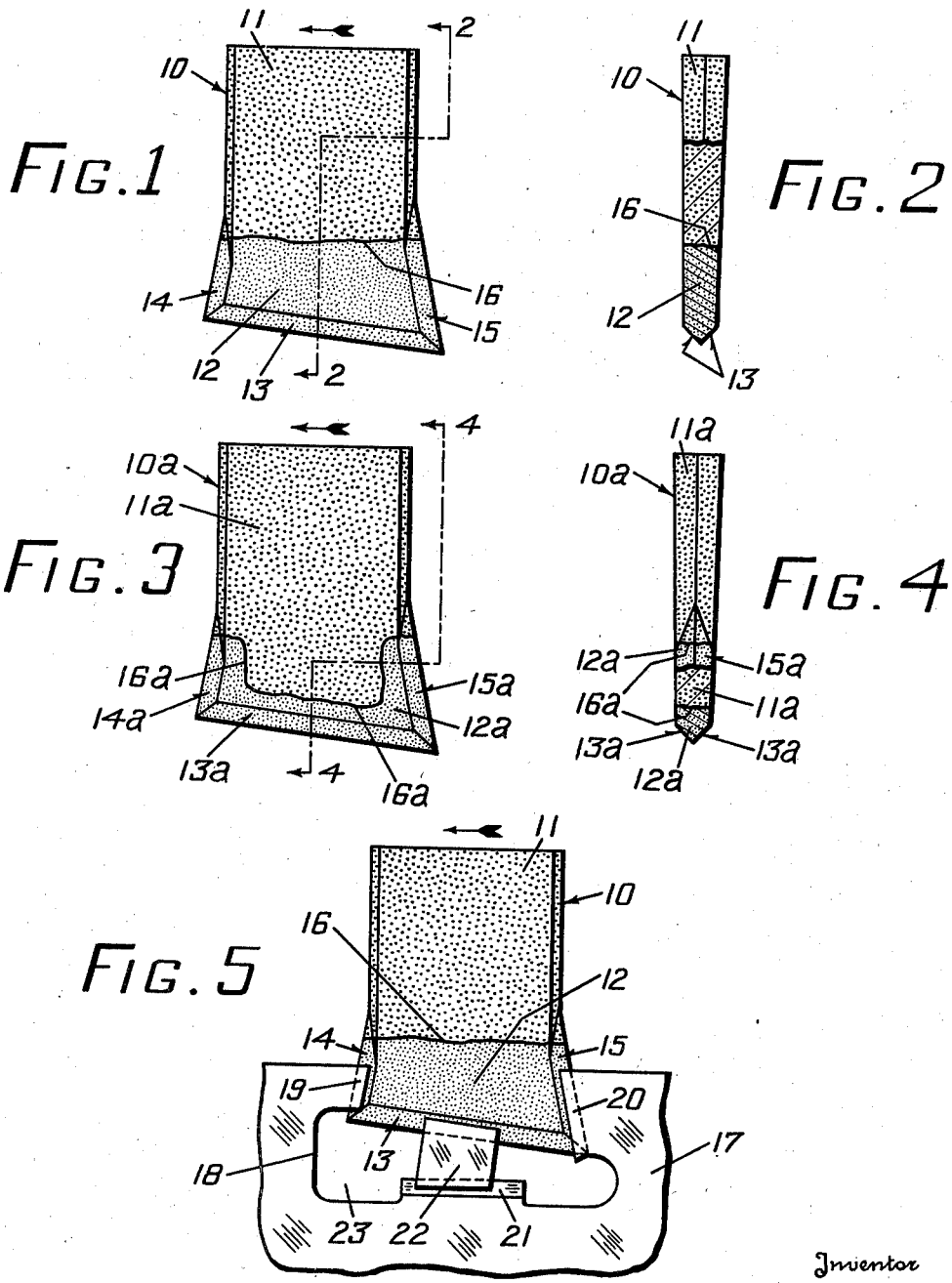
Inventor
RALPH N. S. MERRITT
By George Armstrong Jr.
Attorney Patented Aug. 3, 1937

2,088,998

UNITED STATES PATENT OFFICE 2,088,998

SAW TOOTH

Ralph N. S. Merritt, Worcester, Mass., assignor to Norton Company, Worcester, Mass., a corporation of Massachusetts Application March 13, 1936, Serial No. 68,598

5 Claims. (Cl. 125—22)

The invention relates to saw teeth, and with regard to its more specific features to an abrasive saw tooth adapted to be detachably mounted and secured in a saw blade of either the circular or reciprocable type for cutting stone and other hard material.

One object of the invention is to provide a saw tooth of the character indicated of durable rigid construction which shall not abrade the socket in which it is held. Another object of the invention is to provide an improved method for the manufacture of a satisfactory saw tooth. Another object of the invention is to form a saw tooth of integral construction yet having an abrasive portion of different structure from the root. Another object of the invention is to avoid the use of special attachments for protection of the socket and wedge of a saw from abrasive action of the root of a saw tooth. Another object of the invention is to provide a saw tooth root of non-spalling characteristics and superior strength integral with the abrasive portion of the tooth. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

In the accompanying drawing in which is shown one of many possible embodiments of the mechanical features of this invention, Figure 1 is a side elevation of an abrasive tooth.

Figure 2 is a sectional elevation taken on the line 2—2 of Figure 1.

Figure 3 is a side elevation of a modified abrasive tooth.

Figure 4 is a sectional elevation taken on the line 4—4 of Figure 3.

Figure 5 is a fragmentary view of a saw and tooth receiving socket showing the abrasive tooth of Figures 1 and 2 held therein.

Referring now to Figures 1 and 2, the saw tooth 10 comprises an abrasive portion 11 which merges with a root portion 12. The root portion 12 has a bevel or V bottom 13, a bevel or V front portion 14 and a bevel or V back portion 15; the bottom, front and back together with a dividing line 16 separating the root 12 from the abrasive portion 11 forming approximately a trapezoid.

Referring now to Figure 5, the trapezoidal root 12 is mounted in a saw 17, usually made of steel, in a socket 18 thereof, which socket has a front V-shaped groove 19 and a back V-shaped groove 20 the apexes of whose dihedral angles are inclined to each other by the same angle as the angle between the front 14 and back 15 of the trapezoid. The socket 18 further provides a convex V portion 21 opposite the bottom 13. A wedge 22 has V grooves in its opposite sides fitting the convex V portion 21 and the convex V bottom 13 respectively.

In order to mount the tooth 10 in the saw 17, which may be a circular saw or a band saw, the trapezoidal portion is first passed by the opposite V portions 19 and 20 until it will enter the socket 18, then the tooth 10 is placed in the plane of the saw 17 and moved radially or outwardly until the front 14 and the back 15 enter into wedging engagement with the V grooves 19 and 20. The wedge 22 may now be inserted from the large open space 23 at one end of the socket, and the wedge may be driven home with a lead hammer or in any other manner. The saw moves in the direction of the arrows, Figures 1 and 5, and consequently on starting up the inertia of the wedges 22 tends to force them into wedging engagement so as to lock the parts together. Nevertheless a saw tooth can be readily removed from the saw.

Considering now the manufacture of the tooth just described, I provide a quantity of abrasive grain. Within the limits of this invention any type of abrasive may be used, for example aluminum oxide in all its forms, or silicon carbide, diamonds, garnet, silica, or any other desired abrasive material. I further provide any suitable bonding material. While various types of bonds might be used in carrying out my invention, I prefer to use one of the organic bonds, for example rubber, shellac, or an artificial resinoid. In the preferred form of the invention I use a bond comprising a phenol-formaldehyde resin or a glycerine phthalic anhydride resin commonly known under the name of "Glyptol".

For the manufacture of the abrasive portion 11 I use any of the above named abrasive materials or any other suitable abrasive material. I prefer to use silicon carbide which has excellent cutting properties with respect to stone. I prefer to use relatively coarse abrasive grain, for example of the order of 12 mesh size, although finer or coarser grain may be employed. If I use an artificial resinoid bond I prepare a mixture of the abrasive grain and bond in a now known manner. The bond is rendered somewhat plastic and each grain is coated with a desired amount of bond. I prepare a quantity of abrasive grain and bond for the manufacture of the abrasive portions 11 of a number of abrasive teeth 10.

For the manufacture of the root portion 12 I use the same bond as is used for the portion 11. I use abrasive grain, the same abrasive grain as is used for the portion 11, in the root portion 12, but a very much smaller size thereof. For example I may use grain of 60 mesh size or smaller. Under conditions which do not involve relative speed such as are met with in grinding by grinding wheels, a fine mesh abrasive grain in an organic bond has relatively little abrasive characteristics on the socket and wedge of a steel saw 17.

Taking a quantity of the fine abrasive material selected as above described, I coat it with bond in the same manner and to the same extent as the abrasive grain is coated. I prepare a separate batch thereof. Furthermore the proportion by volume of abrasive grain to bond in the portion 11 should be the same as the proportion of fine grain to bond in the root portion 12, in the preferred form of my invention.

I now provide any suitable mold to form an abrasive tooth as shown. Known molds for the manufacture of abrasive saw teeth may be used. Having calculated the quantity of abrasive grain and bond by weight for the portion 11, and having calculated the quantity of fine grain and bond by weight for the portion 12 to give the same structure for each portion from the standpoint of volume relationship of abrasive or fine grain on the one hand, bond on the other hand and pore space also, I place in that portion of the mold which is to form the abrasive portion 11 the required amount of abrasive and bond mixture. I place in that portion of the mold which is to form the root portion 12 the required quantity of fine grain and bond mixture. The two mixtures will come together along the line 16. Filling the mold may be done by hand with the aid of a trowel or a knife or the like.

I now press the combined mixture with the desired amount of pressure, and then cure in a curing oven in the usual manner for the type of bond used, curing and vulcanizing being well known. The result is an integral structure and although there is a dividing line 16 separating the two portions thereof this is not a line of weakness.

Referring now to Figures 3 and 4, the abrasive tooth thereof is made exactly as described in the case of the abrasive tooth of Figures 1 and 2 excepting that the abrasive portion 11a extends further down and is bounded from the fine grain portion 12a by an irregular line 16a as shown. In other words, the portion of fine grain material 12a is in the nature of a sheath around the abrasive portion 11a. From one point of view the root of the tooth 10a consists partly of abrasive material 11a with an outside sheath of less abrasive material 12a. The manufacture of the tooth 10a is the same excepting that a slight amount of fine grain mixture is provided and a greater amount of abrasive mixture and the mold is first filled to the dividing line 16a.

The abrasive tooth according to either modification is a strong integral unit and furthermore as in the root portion 12 or 12a finely divided comminuted material is used, crumbling of the edges is avoided. By using fine grains for the root portion 12 of the same abrasive material as is used for the abrasive portion 11, the granular material in both sections is of the same specific gravity. This permits the tooth to be manufactured in a single mold and at a single molding operation, something which is difficult when granular materials of different specific gravities are used. Thus the present invention presents certain advantages in manufacture and achieves an integral product, and these advantages may in certain cases offset the slight abrasive qualities of the fine grained root portion.

It will thus be seen that there has been provided by this invention a method and an apparatus in which the various objects hereinbefore set forth are successfully achieved. As many possible embodiments may be made of the mechanical features of this invention, and as the art herein described may be varied in various parts, all without departing from the scope of the invention, it is to be understood that all matter hereinbefore set forth or shown in the accompanying drawing is to be interpreted as illustrative and not in a limiting sense.

I claim:

1. A saw tooth adapted to be removably mounted and wedgingly clamped in a socket of a saw blade comprising a molded body having an abrasive portion formed of relatively coarse abrasive grains united together integrally by a bond and adapted to be exposed outside the saw socket, and a molded root formed of fine grains substantially one fifth the size of the coarse abrasive grains aforesaid or smaller and of the same abrasive material as the abrasive grains aforesaid and of the same bond as forms the abrasive portion said root being integral with the abrasive portion and shaped to be mounted in the same socket, said root having a plurality of holding surfaces shaped directly to engage and fit the respective tooth holding portions of the same socket and the clamping wedge employed therein.

2. A saw tooth adapted to be removably mounted and wedgingly clamped in a socket of a saw blade comprising a molded body provided with an abrasive portion formed of relatively coarse abrasive grains united together integrally by an organic bond and adapted to be exposed outside of the saw socket, and a root integral with the abrasive portion and shaped to be mounted in the saw socket, said root being formed of the same organic bond combined with abrasive grains of the same substance as the aforesaid abrasive grains but of very much smaller grain size, not larger than one fifth thereof.

3. A saw tooth adapted to be removably mounted and wedgingly clamped in a socket of a saw blade comprising a molded body having an abrasive portion formed of relatively coarse abrasive grains united together integrally by an organic bond and adapted to be exposed outside of the saw socket for a cutting operation, and a root integral with the abrasive portion and shaped to be mounted in the saw socket, said root being composed of finely divided, i. e. 60 mesh size or smaller, abrasive material of the same substance as the aforesaid abrasive grains united together into an integral mass by the same organic bond as aforesaid.

4. A saw tooth adapted to be removably mounted and wedgingly clamped in a socket of a saw blade comprising a molded body having an abrasive portion formed of abrasive grains united together integrally by an organic bond and adapted to be exposed outside of the saw socket, and a root integral with the abrasive portion and shaped to be mounted in the saw socket, said root being composed of finely divided abrasive material of the same substance as the aforesaid abrasive grains but only a small fraction of the size thereof bonded together in an integral mass by the same organic bond.

5. In a stone saw having a plurality of saw teeth adapted to be removably mounted and wedgingly clamped in a series of sockets in the saw blade, the combination of saw blade having a socket in the edge thereof, a clamp wedged therein, and a replaceable cutting tooth secured in the socket, said tooth comprising a molded body having an abrasive portion of organic bonded abrasive grain projecting beyond the edge of the saw blade for a cutting operation and provided with a root of the same molded organic material integrally united with the abrasive portion and adapted directly to engage and fit the wheels of the socket and the clamping wedge therein, the root having therein fine sized abrasive grains of a size but a small fraction of the abrasive grains aforesaid, whereby the tooth is rigidly held in place without detrimental abrasion and wear on the saw parts under conditions of use.

RALPH N. S. MERRITT.